US010460213B2

United States Patent
Kang et al.

(10) Patent No.: US 10,460,213 B2
(45) Date of Patent: Oct. 29, 2019

(54) METHOD, APPARATUS AND COMPUTER PROGRAM STORED IN COMPUTER READABLE MEDIUM FOR STATE DECISION OF IMAGE DATA

(71) Applicant: SuaLab Co., Ltd., Seoul (KR)

(72) Inventors: Hyeong Shin Kang, Seoul (KR); Gwang Min Kim, Bucheon-si (KR); Kyeong Mok Byeon, Seoul (KR)

(73) Assignee: SuaLab Co., Ltd., Seoul (KR)

( * ) Notice: Subject to any disclaimer, the term of this patent is extended or adjusted under 35 U.S.C. 154(b) by 108 days.

(21) Appl. No.: 15/495,891

(22) Filed: Apr. 24, 2017

(65) Prior Publication Data
US 2018/0157937 A1 Jun. 7, 2018

(30) Foreign Application Priority Data
Dec. 2, 2016 (KR) .................. 10-2016-0163451

(51) Int. Cl.
*G06K 9/00* (2006.01)
*G06K 9/62* (2006.01)
*G06K 9/66* (2006.01)

(52) U.S. Cl.
CPC ............ *G06K 9/66* (2013.01); *G06K 9/6267* (2013.01)

(58) Field of Classification Search
None
See application file for complete search history.

(56) References Cited

U.S. PATENT DOCUMENTS

| 7,698,239 | B2 | 4/2010 | Lieuallen et al. | |
| 2016/0127405 | A1* | 5/2016 | Kasahara | H04L 63/1425 726/23 |
| 2016/0140300 | A1* | 5/2016 | Purdie | G06F 19/3481 705/2 |
| 2016/0140408 | A1 | 5/2016 | Shen et al. | |
| 2017/0024649 | A1* | 1/2017 | Yan | G06N 3/0454 |
| 2018/0144214 | A1* | 5/2018 | Hsieh | G06T 7/0012 |
| 2018/0365824 | A1* | 12/2018 | Yuh | G06K 9/6262 |
| 2019/0050987 | A1* | 2/2019 | Hsieh | G06T 7/0012 |

FOREIGN PATENT DOCUMENTS

KR 10-2011-0109345 10/2011

OTHER PUBLICATIONS

Heo et al., "Deep learning-based video story studying technology," Korea Multimedia Society Bulletin, vol. 20, No. 3, pp. 23-40, Sep. 2016.
Office Action for Korean Application No. 10-2016-0163451 issued by Korean Intellectual Property Office (KIPO), Sep. 18, 2017.

* cited by examiner

*Primary Examiner* — Randolph I Chu
(74) *Attorney, Agent, or Firm* — Martin & Ferraro, LLP

(57) ABSTRACT

Disclosed is a method for state decision of image data. The method for state decision of image data may include: acquiring first output data by the network function based on the image data; acquiring second output data by an algorithm having a different effect from the network function based on the image data; and deciding state information of the image data based on the first output data and the second output data.

12 Claims, 19 Drawing Sheets

METHOD, APPARATUS AND COMPUTER PROGRAM STORED IN COMPUTER READABLE MEDIUM FOR STATE DECISION OF IMAGE DATA

CROSS-REFERENCE TO RELATED APPLICATIONS

This application claims priority to and the benefit of Korean Patent Application No. 10-2016-0163451 filed in the Korean Intellectual Property Office on Dec. 2, 2016, the entire contents of which are incorporated herein by reference.

TECHNICAL FIELD

The present disclosure relates to state decision of image data, and more particularly, to state decision of image data using a network function.

BACKGROUND ART

Pattern recognition as one field of machine learning means a study that recognizes regularities of a pattern and data. A pattern recognition technology includes a supervised learning method and an unsupervised learning method. The supervised learning method means a method in which an algorithm learns the pattern recognition by using data (referred to as "training" data) in which a result of the pattern recognition is already determined. Herein, respective training data may be called labeled data. The unsupervised learning method means a method in which the algorithm discovers a pattern which is not previously known without the labeled data.

A neural network may be used in order to implement the pattern recognition technology. The neutral network is constituted by two or more nodes and links linking the nodes. Weights may be set in the respective links and the weights granted to the links are variable. The weights assigned to the links may be modified to be suitable for performing the pattern recognition intended by the neural network.

U.S. Pat. No. 7,698,239 illustrates one example of the neural network.

SUMMARY OF THE INVENTION

The present disclosure has been made in an effort to provide a method for state decision of data.

The present disclosure has also been made in an effort to provide state information of image data through the method for state decision of image data.

An exemplary embodiment of the present disclosure provides a method for state decision of image data using a network function learned with respect to at least one pattern. The method for state decision of image data may include: acquiring first output data by the network function based on the image data; acquiring second output data by an algorithm having a different effect from the network function based on the image data; and deciding state information of the image data based on the first output data and the second output data.

Alternatively, the network function may include a plurality of links having a plurality of nodes and weights and include at least one input node and at least one output node.

Alternatively, the network function may include an aggregate of one or more nodes including the plurality of links having the plurality of nodes and weights, and include an aggregate constituted by nodes of the same number as or the smaller number than the nodes of the aggregate of the input nodes.

Alternatively, the method may further include deciding at least one of the node, the weight, and a connection state of the network function based on predetermined image data before the acquiring of the first output data.

Alternatively, the method may further include repeating the deciding of at least one of the node, the weight, and the connection state of the network function and the predetermined image data may be one or more normal image data having no defect.

Alternatively, the algorithm may be an algorithm in which at least some of the image data are lost or modified.

Alternatively, the algorithm may be an algorithm in which the image data is split into images having a predetermined size and thereafter, the second output data is acquired based on an average data value of the split images.

Alternatively, the predetermined size may be a size set based on a data loss rate of the network function.

Alternatively, the second output data may be image data modified so that at least one of an image resolution, an image size, an image color mode, and an aspect ratio is the same as that of the first output data.

Alternatively, in the deciding of the state information, the state information of the image data may be decided based on the sameness of the first output data and the second output data.

Alternatively, in the deciding of the state information, the state information of the image data may be decided based on a difference image of the first output data and the second Output data.

Another exemplary embodiment of the present disclosure provides a method for state decision of image data using a network function learned with respect to at least one pattern. The method for state decision of image data may include: acquiring third output data by a first network function based on the image data; acquiring fourth output data by a second network function different from the first network function based on the third output data; and deciding state information of the image data based on the image data and the fourth output data.

Alternatively, the second network function may be a network function that reconstructs at least some data of the third output data which is lost.

Yet another exemplary embodiment of the present disclosure provides an apparatus for state decision of image data using a network function learned with respect to at least one pattern. The apparatus for state decision of image data may include: a camera unit capturing a state decision target; and a controller controlling the apparatus and performing calculation by using the network function, and the controller may include a data acquiring module acquiring first output data by the network function based on the image data, a calculation module acquiring second output data by an algorithm having a different effect from the network function based on the image data, and a state deciding module deciding state information of the image data based on the first output data and the second output data.

Yet another exemplary embodiment of the present disclosure provides an apparatus for state decision of image data using a network function learned with respect to at least one pattern. The apparatus for state decision of image data may include: a camera unit capturing a state decision target; and a controller controlling the apparatus and performing calculation by using the network function, and the controller may include a calculation module acquiring third output data by a first network function based on the image data and acquiring fourth output data by a second network function different from the first network function based on the third output data, and a state deciding module deciding state information of the image data based on the image data and the fourth output data.

Still yet another exemplary embodiment of the present disclosure provides a computer program stored in a computer readable storing medium, which includes a plurality of commands executed by one or more processors of an apparatus for state decision of image data. The computer program may include: a command to allow a calculation module to acquire first output data by a network function based on the image data; a command to allow the calculation module to acquire second output data by an algorithm having a different effect from the network function based on the image data; and a command to allow a state deciding module to decide state information of the image data based on the first output data and the second output data.

Still yet another exemplary embodiment of the present disclosure provides a computer program stored in a computer readable storing medium, which includes a plurality of commands executed by one or more processors of an apparatus for state decision of image data. The computer program may include: a command to acquire third output data by a first network function based on the image data; a command to acquire fourth output data by a second network function different from the first network function based on the third output data; and a command to decide state information of the image data based on the image data and the fourth output data.

According to exemplary embodiments of the present disclosure, state information of image data can be provided based on input image data.

A defect of an image data capturing target can be examined through the state information of the image data.

BRIEF DESCRIPTION OF THE DRAWINGS

Some of the exemplary embodiments are illustrated in the accompanying drawings so as to appreciate the aforementioned features of the contents of the present disclosure by a detailed and more concrete description with reference to the following exemplary embodiments. Further, similar reference numerals to the drawings are intended to designate the same or similar function through various aspects. However, the accompanying drawings illustrate only specific typical exemplary embodiments of the contents of the present disclosure and are not considered to limit the scope of the present disclosure and it should be noted that other exemplary embodiments having the same effect may be sufficiently recognized.

DETAILED DESCRIPTION

Various exemplary embodiments will be now described with reference to drawings. In the present specification, various descriptions are presented to provide appreciation of the present disclosure. However, it is apparent that the exemplary embodiments can be executed without the specific description.

The term "or" is intended to mean not exclusive "or" but inclusive "or". That is, when not separately specified or not clear in terms of a context, the case where "X uses A or B" is intended to mean one of natural inclusive substitutions. That is, "X uses A or B" may be applied to either of the case where X uses A, the case where X uses B, or the case where X uses both A and B. Further, it should be understood that the term "and/or" used in the specification designates and includes all available combinations of one or more items among enumerated related items.

The word "comprises" and/or "comprising" means that the corresponding feature and/or component is present, but it should be appreciated that presence or addition of one or more other features, components, and/or a group thereof is not excluded. Further, when not separately specified or not clear in terms of the context by indicating a singular form, it should be construed that the singular generally means "one or more" in the present specification and the claims.

The description of the presented exemplary embodiments is provided so that those skilled in the art of the present disclosure use or implement the present disclosure. Various modifications of the exemplary embodiments will be apparent to those skilled in the art and general principles defined herein can be applied to other exemplary embodiments without departing from the scope of the present disclosure. Therefore, the present disclosure is not limited to the exemplary embodiments presented herein, but should be analyzed within the widest range which is coherent with the principles and new features presented herein.

Figure 1:
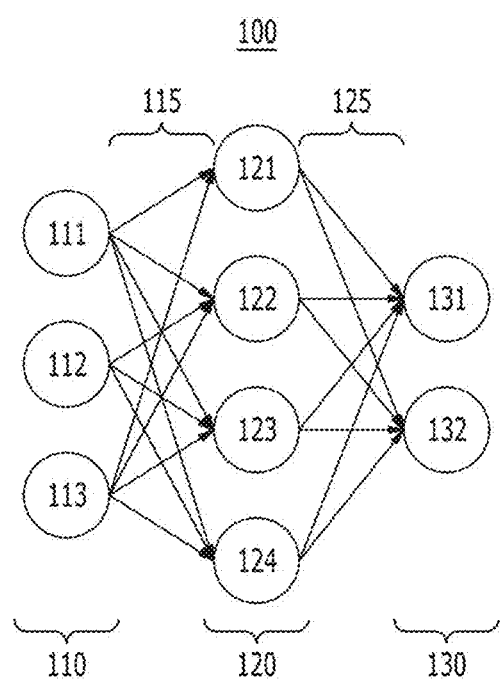
FIG. 1 is a conceptual view illustrating one example of a neural network according to an exemplary embodiment of the present disclosure.

FIG. 1 is a conceptual view illustrating one example of a neural network according to an exemplary embodiment of the present disclosure.

Throughout the present specification, the neural network, a network function, and the neural network may be used as the same meaning. The neural network may be generally constituted by an aggregate of calculation units which are mutually connected to each other, which may be called "node". The "nodes" may also be called "neurons". The neural network is configured to include two or more nodes. The nodes (alternatively, neurons) constituting the neural networks may be mutually connected to each other by one or more "links".

In the neural network, two or more nodes connected through the link may relatively form the relationship between an input node and an output node. Concepts of the input node and the output node are relative and a predetermined node which is in the output node relationship with respect to one node may have the input node relationship in the relationship with another node and vice versa. As described above, the relationship of the output node to the input node may be generated based on the link. One or more output nodes may be connected to one input node through the link and vice versa.

In the relationship of the input node and the output node connected through one link, a value of the output node may be determined based on data input in the input node. Herein, a node connecting the input node and the output node to each other may have a weight. The weight is variable and the weight is variable by a user or an algorithm in order for the neural network to perform a desired function. For example, when one or more input nodes are mutually connected to one output node by the respective links, the output node may determine an output node value based on values input in the input nodes connected with the output node and the weights set in the links corresponding to the respective input nodes.

As described above, in the neural network, two or more nodes are connected to each other through one or more links to form the input node and output node relationships in the neural network. A characteristic of the neural network may be determined according to the number of nodes in the network, the number of links, correlations between the nodes and the links, and values of the weights granted to the respective links. For example, when the same number of nodes and links exist and two neural networks in which the weight values of the links are different from each other exist, it may be recognized that two neural networks are different from each other.

As illustrated in FIG. 1, the neural network may be configured to include two or more nodes. Some of the nodes constituting the neural network may constitute one layer based on distances from an initial input node. For example, an aggregation of nodes which of which distances from the initial input node are n may constitute an n layer. The distance from the initial input node may be defined by the minimum number of links required for reaching the corresponding node from the initial input node up to the corresponding node. However, definition of the layer is predetermined for description and the order of the layer in the neural network may be defined by a method different from the aforementioned method. For example, the layers of the nodes may be defined by the distance from a final output node.

The initial input node may mean one or more nodes in which data is directly input without passing through the links in the relationships with other nodes among the nodes in the neural network. Alternatively, in the neural network, in the relationship between the nodes based on the link, the initial input node may mean nodes which do not have other input nodes connected through the links. Similarly thereto, the final output node may mean one or more nodes which do not have the output node in the relationship with other nodes among the nodes in the neural network. Further, a hidden node may mean not the initial input node and the final output node but the nodes constituting the neural network.

In the exemplary embodiment illustrated in FIG. 1, the neural network may have 3 layers. 3 layers may include an initial input layer 110, a hidden layer 120, and a final output layer 130 according to the aforementioned definition. However, the exemplary neural network illustrated in FIG. 1 is simplified for description and the number of layers and the number of nodes constituting the neural network may be variously set according to a purpose of the neural network and the resulting complexity. In other words, the neural network including two or more hidden layers (not illustrated) may exist. Further, the number of nodes included in the respective layers may be larger or smaller than the number illustrated in FIG. 1.

In the initial input layer 110, information on a target which the neural network intends to decide may be input in respective nodes 111, 112, and 113 constituting the initial input layer 110. The number of input nodes of the initial input layer 110 may be configured differently according to the type of the neural network. In one example, when the target which the neural network intends to decide is image data, input data extracted from the image data may be input in the initial input layer 110 of the neural network. In different neural networks having the same purpose, which decides the image data, the number of input nodes (not illustrated) of the neural network may be determined differently according to the purpose, a design, accuracy, and the like of the neural network.

For example, in one neural network, input nodes (not illustrated) of the number corresponding to the number of optical information on each pixel constituting the image data may be included in the initial input layer 110. For example, in the case of a neural network for deciding quadrangular image data having a size of 128×128 in width and length, information on R, G, and B values for the respective pixels may be input in the initial input layer 110 of the neural network. Therefore, the initial input layer may include 128×128×3 input nodes. In another example, in the neural network for deciding the image data, nodes of the smaller number than the aforementioned example may be included in the initial input layer 110. For example, values (for example, the number of pixels and the number of inflection points which are consecutive on the image data) indicating features of the image data to be decided may be input in the initial input layer.

The aforementioned exemplary embodiments are just used for description and neural networks used in the exemplary embodiment disclosed in the disclosure are not limited to the neural network for deciding the image data and the neural networks may process various data (for example, data indicating communication states of nodes on a computer network, data included in a computer file to be compressed, data indicating a physical state of a mechanical component in the robotics engineering, financial analysis data, and the like) as the input data.

In the neural network 100, data input in one n layer may be output to an n+1 layer. Nodes included in the n layer may be connected with the nodes included in the n+1 layer through the link. One node included in the n+1 layer may include a value calculated based on one or more nodes included in the n layer connected with the corresponding node through the link and the weights granted to one or more links as an input value. In other words, when k nodes $Nnode_1$, $Nnode_2$, $Nnode_3$, $Nnode_k$ included in the n layer and one node $(N+1)node_1$ included in the n+1 node are connected by k links $L_1, \ldots, L_k$, the following formula may be established.

$$\text{Value}((N+1)node_1) = f(\text{weight}(L_1), \text{weight}(L_2), \ldots, \text{weight}(L_k), \text{value}(Nnode_1), \text{value}(Nnode_2), \ldots, \text{value}(Nnode_k)) \quad (1)$$

Herein, Value (X) may mean a node value input in node X which exists in the neural network. Weight(L) may mean the weight of link L which exists in the neural network. y=f(x) may mean that a value of y has a function relationship determined based on an x factor.

Other nodes included in the n+1 layer may also have the values of the nodes included in the n layer and the value calculated based on the weights of the links as the input value. In other words, the node values which need to be input in the nodes included in the n+1 layer may be determined based on the values of the nodes included in the n layer, connection relationships of the links for connecting the nodes of the n layer and the nodes of the n+1 layer to each other, and the weights thereof.

As described above, the initial input layer 110 may be defined as 0 layer. Therefore, the initial input layer 110 and the hidden layer 120 of FIG. 1 are the 0 layer and 1 layer and according to a calculation method in the neural network, values of nodes 121, 122, 123, and 124 included in 1 layer (hidden layer 120) may be determined based on the data input in the nodes 111, 112, and 113 included in the 0 layer input layer 110) and the weights of the links 115. Similarly, the values of nodes 131 and 132 included in a 2 layer (final output layer 130) may be determined based on the nodes 121, 122, 123, and 124 included in the 1 layer 120 and the weights of the links 125.

The neural network 100 illustrated in FIG. 1 is just one example of the neural network and it is apparent to those skilled in the art that various types of neural networks may exist. The neural network may be called the network function in that input and output values exist. In other words, in the present specification, it may be appreciated that the network function means the neural network.

In the present specification, the network function and the neural network may be used to be exchangeable with each other. Further, it may be appreciated that the network function and the neural network include an auto encoder, a Diabolo network, and the like. When two or more neural networks exist, in the case where the output nodes of one neural network become the input nodes of another neural network, it may be regarded that two or more neural networks are connected in series. When two or more neural networks are connected in series, two or more neural networks which are connected in series may constitute one neural network.

Meanwhile, objects to be examined are imaged and examined in a process through the neural network and target patterns are discovered. For example, textile fabric imaged during manufacturing may be examined in order to find scratch and various targets may be imaged and examined in order to find a defect of a hole of a material or a semiconductor circuit. There is a limit in a person's testing and analyzing an image and a method for state decision of image data having high accuracy is required in the art.

Figure 2A:
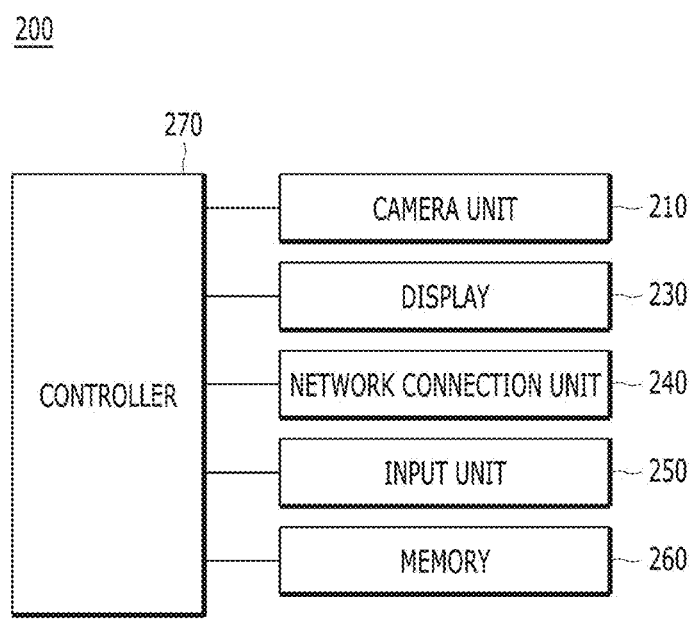
FIG. 2A is a block diagram illustrating a configuration of an apparatus for state decision of image data according to an exemplary embodiment of the present disclosure.

FIG. 2A is a block diagram illustrating a configuration of an apparatus for state decision of image data according to an exemplary embodiment of the present disclosure.

The method for decision of image data according to the exe embodiment of the present disclosure may be executed in apparatuses having a calculation capability. For example, the method for decision of image data may be performed in a personal computer (PC), a workstation, a computing apparatus for a server, and the like. Alternatively, the method for decision of image data may be performed by a separate apparatus for performing the method for decision of image data according to the exemplary embodiment of the present disclosure. The method according to the exemplary embodiment of the present disclosure may be performed in one or more calculation apparatuses. For example, one or more steps in the method for decision of image data according to the present disclosure may be performed by a client device and other steps may be performed by a server device. In this case, the client device and the server device are connected through the network to transmit and receive a calculation result. Alternatively, the method for decision of image data according to the exemplary embodiment of the present disclosure may be performed by a distributed computing technology.

According to one aspect of the present disclosure, an apparatus 200 for state decision of image data may include a camera unit 210, a display 230, a network connection unit 240, an input unit 250, a memory 260, and a controller 270. Components of FIG. 2 are exemplary and additionally, the device may further include a user input unit, an illumination unit, and the like. Further, the device may be constituted only by some of the components. The device may be used by communicating with an external server and include a server in itself.

According to the exemplary embodiment of the present disclosure, the camera unit 210 may acquire an image by capturing a decision target. A capture object which becomes the decision target may include various capture objects including fabric, leather, a skin, a part of a human body, a baggage, animals and plants, and the like. The capture object is just an example and the camera unit 210 may capture the capture object without a limit of the type of the capture object and the present disclosure is not limited thereto. The images captured by the camera unit may be stored in the memory 260 or transmitted to the outside through the network connection unit 240. The camera unit 210 may be constituted by one camera or two or more cameras according to a use environment.

In the exemplary embodiment, the camera unit 210 may be integrally connected to the apparatus 200 for state decision of image data according to the exemplary embodiment of the present disclosure or may be configured as a removable module. The camera unit 210 may include various hardware components in order to acquire the image data which becomes the target for the state decision.

As one example, the camera unit 210 may operate together with, for example, a capture object transport means (not illustrated) such as a conveyor belt in order to rapidly acquire data regarding the capture object. The capture object transport means (not illustrated) may be the component of the apparatus 200 according to the exemplary embodiment of the present disclosure or the component of a separate external device. For example, the camera unit 210 may be configured as a line camera for scanning an object to be captured, which moves along the conveyor belt. However, the configuration of the camera unit 210 according to the exemplary embodiment of the present disclosure is not limited to the aforementioned configuration and a predetermined combination for efficiently acquiring the image data may be used in the exemplary embodiment of the present disclosure.

The camera unit 210 may capture various types of images. A capturing output of the camera unit 210 may include a 3D image, a black and white image, a GIF image stored with time, a video image, an infrared image, an electronic image, and the like. Further, the camera unit 210 may include a film camera, a digital camera, a microscope, a magnifier, an infrared camera, an ultraviolet (UV) camera, an X-Ray, a magnetic resonance imaging (MRI) device, and a predetermined image acquiring device. The configuration of the camera unit 210 may vary depending on the capture object of the captured target.

According to the exemplary embodiment of the present disclosure, the display 230 may display the image captured by the camera unit 210. The display 230 may display the image currently captured by the camera unit 210 and load and display the image stored in the memory 260. The display 230 may output a sound. The display 230 may output not the captured target but a warning sound according to a state decision result. The display 230 may output the state decision result for the capture object. Further, the display 230 may receive and output the image of the external apparatus and output an image state decision result of the external apparatus. The display 230 may output a capturable capturing mode. For example, the display 230 may output 200 dpi, 300 dpi, 600 dpi, and the like which are image resolutions to be selected. Further, the display 230 may output a selection screen so as to select an image size, an image capturing mode, a capturing device, and the like. The display 230 may be configured as predetermined visual output devices including an LCD, an LED, a CRT, and the like. The examples and components of the display are just examples and the present disclosure is not limited thereto.

According to the exemplary embodiment of the present disclosure, the network connection unit 240 may transmit the image captured by the camera unit 210 to another apparatus or server. When an image capturing apparatus and an image deciding apparatus are separately configured, the network connection unit 240 may include one or more modules Which enable wireless communication between both apparatuses. The network connection unit 240 may include a transmission unit and a reception unit. The network connection unit 240 may include a wired/wireless Internet module tier network access. As a wireless Internet technology, wireless LAN (WLAN) (Wi-Fi), wireless broadband (Wibro), world Interoperability for microwave access (Wimax), high speed downlink packet access (HSDPA), and the like may be used. As a wired Internet technology, digital subscriber line (XDSL), fibers to the home (FTTH), power line communication (PLC), and the like may be used.

According to the exemplary embodiment of the present disclosure, the network connection unit 240 may receive the image from the external apparatus or server. The controller 270 may decide or classify a degree of the received image by performing the state decision of the image data. The camera unit 210 capturing the image and the controller 270 extracting the image data from the image and deciding the state of the image data may be configured as separate devices. The received image may be a digital video, a digital image, compressed data, a RAW image, a data file, and the like and data which may be converted into the image may be received without a limit in type. The controller 270 may use the image received from the outside through the network connection unit 160 for deciding the state of the image data and decide the state of a state decision capture object through the state decision of the image.

The network connection unit 240 may be positioned at a comparatively short distance from the apparatus for state decision of image data including a short range communication module and transmit and receive data to and from an electronic apparatus including the short range communication module. As a short range communication technology, Bluetooth, radio frequency identification (RFID), infrared data association (IrDA), ultra wideband (UWB), ZigBee, and the like may be used. In the exemplary embodiment of the present disclosure, the network connection unit 160 may sense a connection state of the network and transmission and reception speeds of the network. The data received through the network connection unit 160 may be output through the display 230, stored through the memory 260, or transmitted to other electronic apparatuses which are positioned in a short range through the short range communication module.

According to the exemplary embodiment of the present disclosure, the input unit 250 may allow the apparatus to be used by connecting the external apparatus or receive the data by accessing a storage apparatus. For example, when a USB storage device is connected to the input unit 250, the image stored in a USB is copied to and stored in the memory 260 or displayed in the display 230.

According to the exemplary embodiment of the present disclosure, the input unit 250 may receive an external manipulation. For example, when a jog included in the input unit 250 is manipulated in order to control the camera unit 210, a capturing location of the camera unit 210 may be changed or a capturing focus of the camera unit 210 may be changed. The input unit 250 may include a switch to change the state decision capture object. The input unit 250 may receive various user inputs.

According to the exemplary embodiment of the present disclosure, the input unit 250 may include or connect one or more external input devices. The user connects an external storage medium to the input unit to perform firmware upgrade, contents storing, and the like of the apparatus 200. Further, the user may connect a keyboard, a mouse, and the like to the input unit 250 and use the connected keyboard, mouse, and the like. In addition, a USB port of the input unit 250 may support USB 2.0 and USB 3.0. Moreover, the input unit 250 may include an interface such as a Thunderbolt, or the like as well as the USB port. Further, the input unit 250 may receive an external input by combining various input devices including a touch screen, a button, and the like and the controller 270 may control the apparatus 200 through the input.

According to the exemplary embodiment of the present disclosure, the memory 260 may store a program for an operation of the controller 270 and temporarily or permanently store input/output data (for example, state decision information, a message, a still image, a moving picture, and the like). The memory 260 may store data regarding the display and the sound. The memory 260 may include at least one type storage medium among flash memory type, hard disk type, multimedia card micro type, card type memories (for example, SD or XD memories, and the like), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk.

The memory 260 may store various network functions and algorithms. The memory 260 may store the program, software, a command, a code, and the like for executing the apparatus 200. The memory 260 includes a cache to temporarily store the image data and temporarily store the program, the command, and the like required for operating the apparatus 200. The memory 260 may store at least a part of the image and the video captured by the camera unit 210. Further, the memory 260 may delete the captured image which is not loaded by another component or another device such as the controller 270, or the like among the stored captured data after a predetermined time. The memory 260 may split the captured image into image patches having various sizes and store the image patches. The configuration of the memory 260 is just an example and the present disclosure is not limited thereto.

Figure 2B:
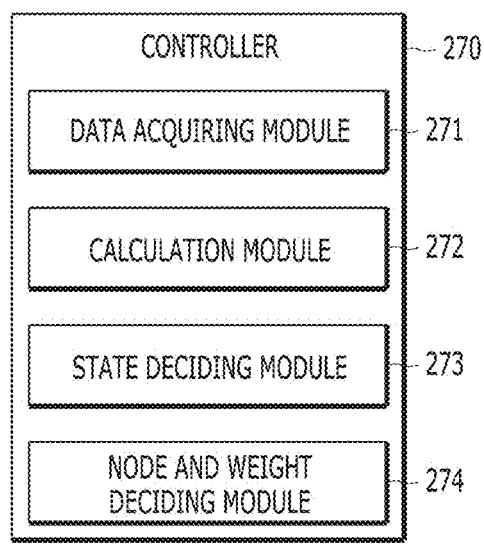
FIG. 2B is a block diagram more specifically illustrating a configuration of a controller according to an exemplary embodiment of the present disclosure.

FIG. 2B is a block diagram more specifically illustrating a configuration of a controller according to the exemplary embodiment of the present disclosure.

According to the exemplary embodiment of the present disclosure, the controller 270 may include a data acquiring module 271, a calculation module 272, a state deciding module 273, and a node and weight deciding module 274. The controller 270 may further include another module or may be configured as some of the modules according to the capture object, the algorithm, and the like. The controller generally controls all operations of the apparatus 200 for state decision of image data. For example, the controller may split the image captured by the camera unit 210 into image patches having a predetermined size, store the captured image in the memory 260, and decide whether the captured image is an image of which the state may be decided.

According to the exemplary embodiment of the present disclosure, the data acquiring module 271 may acquire the image data which may be decided in the image captured by the camera unit 210. Further, the data acquiring module 271 may acquire the image data which may be decided in the image input through the input unit 250. In addition, the data acquiring module 271 may acquire the image data by splitting the image captured by the camera unit 210 into the image patches having the predetermined size. The image input in the data acquiring module 271 may be received without a limit in format such as jpg, png, tif, psd, Ai, or the like and further, the data may be received without a limit even in a file type such as a moving image, a video file, or the like.

According to the exemplary embodiment of the present disclosure, the calculation module 272 may acquire first output data by the network function based on the image data. The calculation module 272 may acquire second output data by the algorithm having a different effect from the network function based on the image data. An output result output by the calculation module 272 may be a numerical value, the image data, and various types of data.

According to another exemplary embodiment of the present disclosure, the calculation module 272 may acquire third output data by a first network function based on the image data. The calculation module 272 may acquire fourth output data by a second network function different from the first network function based on the third output data. The calculation module 272 may calculate the output data to be output based on the data input through the network function. The calculation module 272 may calculate the data input based on the network function and output the output data. The network function does not operate of itself and the calculation module 272 may execute the calculation through the network function.

According to an exemplary embodiment of the present disclosure, the state deciding module 273 may decide state information of the image data based on the data acquired by the calculation module 272. The state deciding module 273 may decide the state information of the image data based on the first output data and the second output data. The state deciding module may decide the state information of the image based on the sameness of the first output data and the second output data. The state information of the image data may be information classified into multiple degrees or categories and decided. Further, the state information of the image data may be information decided as normal and abnormal.

According to another exemplary embodiment of the present disclosure, the state deciding module may decide the state information of the image data based on the image data and the fourth output data. The state deciding module 273 may decide the state information of the image based on the sameness of the fourth output data and the image data. The state deciding module may compare the image data based on the sameness without being limited to the data type and decide the state information.

According to the exemplary embodiment of the present disclosure, the node and weight deciding module 274 may decide at least one of the node of the network function, the weight, and the connection state. The node and weight deciding module 274 may decide at least one of the node, the weight, and the connection state so as to output a most accurate image state decision result based on predetermined image data. The node and weight deciding module 274 may be used only in a prior learning step and may not be used in deciding the image. In the prior learning step, the node and weight deciding module 274 may complement the network function so as to output the most accurate image state decision result while repeatedly adding, deleting, and changing the node, the weight, the connection state, and the like.

As illustrated in FIGS. 2A and 2B, the controller 270 may communicate with all of the other components to organically control the operations of the components.

Various exemplary embodiments described herein may be implemented in a computer-readable recording medium or a recording medium readable by a device similar to the computer by using, for example, software, hardware, or a combination thereof. According to hardware implementation, the exemplary embodiment described herein may be implemented by using at least one of ASICs (application specific integrated circuits), DSPs (digital signal processors), DSPDs (digital signal processing devices), PLDs (programmable logic devices), FPGAs (field programmable gate arrays), processors, controllers, micro-controllers, microprocessors, and electric units for performing other functions. In some cases, the exemplary embodiments described in the specification may be implemented by the controller 270 itself. For example, when the prior learning step is not included according to the exemplary embodiment of the present disclosure, the node and weight deciding module 274 is excluded and the controller 270 may be configured. According to software implementation, exemplary embodiments such as a procedure and a function described in the specification may be implemented by separate software modules. Each of the software modules may perform one or more functions and operations described in the specification. A software code may be implemented by a software application written by an appropriate program language. The software code may be stored in the memory 260 and executed by the controller 270.

Figure 3:
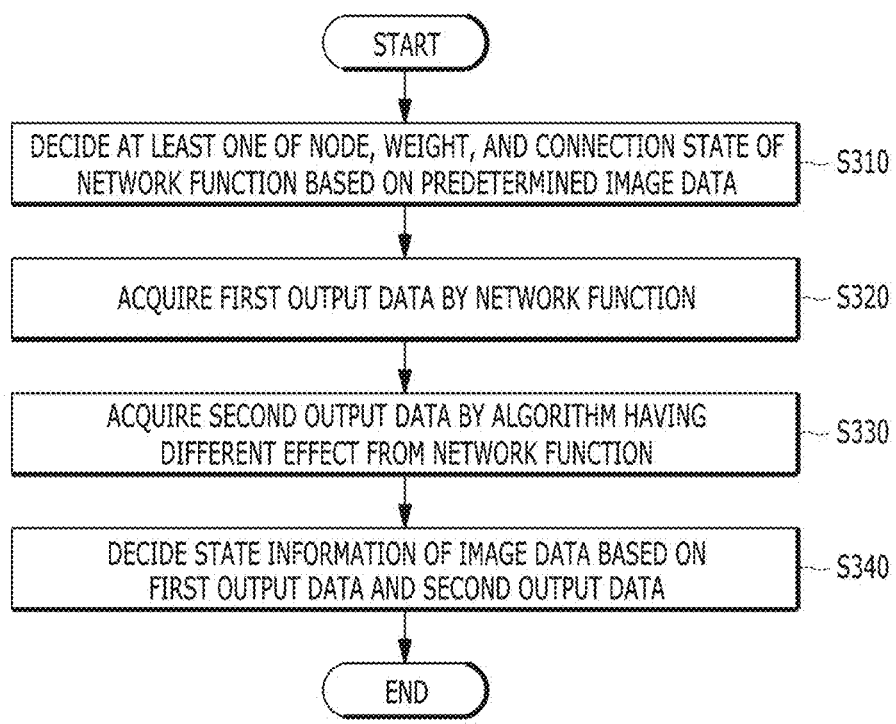
FIG. 3 is a flowchart illustrating a method for state decision of image data using a network function learned with respect to at least one pattern according to an exemplary embodiment of the present disclosure.

FIG. 3 is a flowchart illustrating a method for state decision of image data using a network function learned with respect to at least one pattern according to an exemplary embodiment of the present disclosure.

The method for state decision of image data according to the exemplary embodiment of the present disclosure may be, for example, used for deciding the state of an atypical pattern. The atypical pattern may mean a pattern associated with image data acquired by capturing, for example, a blood vessel structure of the human body, a pattern of leather, an external shape of a specific animal (for example, fishes), human handwriting, and the like.

The method for state decision of image data according to the exemplary embodiment of the present disclosure may be, for example, used for classifying the state of the image data to be decided. The number of states of the image data to be decided may be two or more. For example, whether the pattern of the leather is damaged or defective, the type of fish, a letter intended by the human handwriting, and the like may be the state of the image data.

In FIG. 3, the method for state decision of image data according to the exemplary embodiment of the present disclosure may include deciding at least one of a node, a weight, and a connection state of a network function based on predetermined image data (S310), acquiring first output data by the network function (S320), acquiring second output data by an algorithm having a different effect from the network function (S330), and deciding state information of the image data based on the first output data and the second output data (S340).

Herein, the network function according to the exemplary embodiment of the present disclosure may include the neural network having output data and input data. Further, the network function may include a plurality of links having a plurality of nodes and weights and include at least one input node and one output node. In addition, the network function may include a predetermined function used in machine running or pattern recognition. The network function according to the exemplary embodiment of the present disclosure may be called a network function that meets a condition suitable for performing a purpose of the present disclosure. For example, the network function may include an autoencoder, an autoassociator, or a Diabolo network.

The autoencoder 400 may be configured to include one input layer 410, one output layer 450, and at least one hidden layer. The number of nodes constituting the input layer of the autoencoder 400 and the number of nodes constituting the output layer may be the same as each other. The autoencoder may be a network function usable in an unsupervised learning model while meeting a definition of the neural network. In other words, the autoencoder may be designed to reconstruct a given input in a given input layer. In the exemplary embodiment, the number of nodes constituting each of the hidden layers constituting the autoencoder 400 may be smaller than the number of nodes constituting the input layer or the output layer. That is, the network function constituting the autoencoder 400 may include an aggregate of nodes of the number equal to or smaller than the number of nodes of the aggregate of input nodes.

Figure 4:
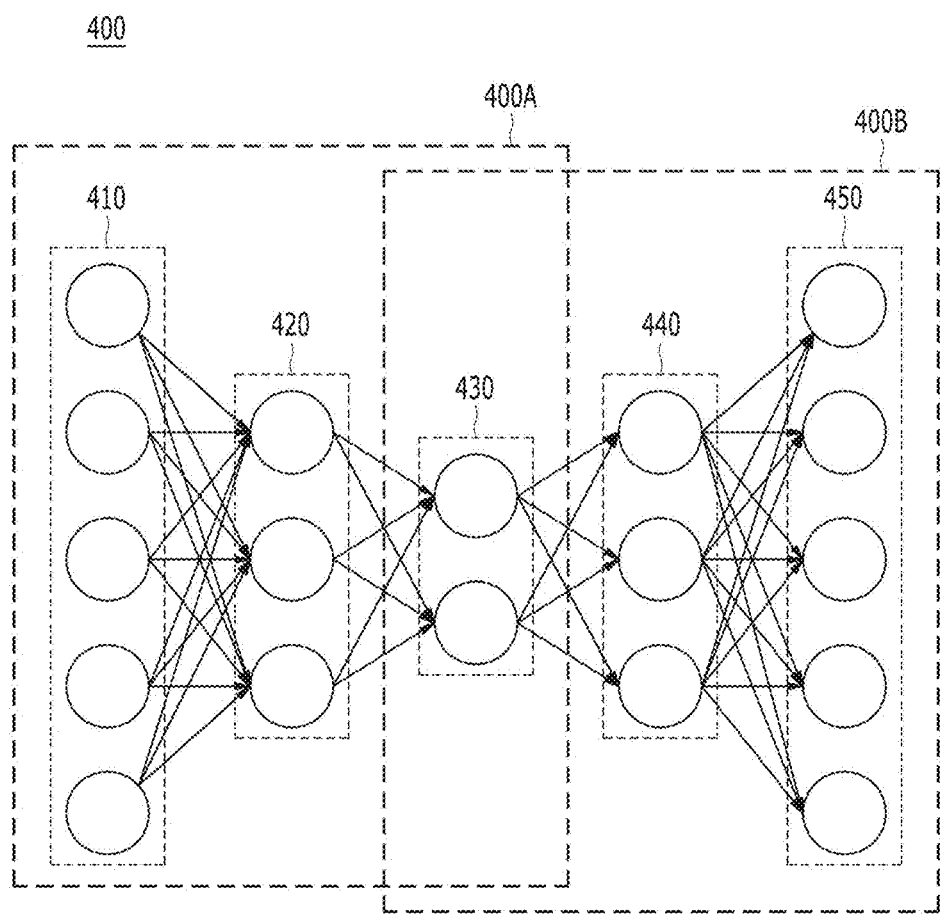
FIG. 4 is a diagram schematically illustrating the structure of an autoencoder among network functions according to an exemplary embodiment of the present disclosure.

FIG. 4 is a diagram schematically illustrating the structure of an auto encoder among network functions according to an exemplary embodiment of the present disclosure. As illustrated in FIG. 3, the autoencoder 400 may include one or more hidden layers while meeting the definition of the neural network. A subset of layers constituting the autoencoder 400 may meet the definition of the neural network in itself. For example, the aggregate of the input layer 410 and the hidden layers 420 and 430 of the autoencoder 400 may be recognized as one neural network. In this case, the part may be called an encoder 400A. Similarly, the aggregate of the hidden layers 430 and 440 and the output layer 450 of the autoencoder 400 may be recognized as one neural network. In this case, the part may be called a decoder 400B. As illustrated in FIG. 4, the output layer of the encoder 400A may be the input layer of the decoder 4009.

In the autoencoder 400, the encoder 400A may perform a function to encode the data input in the input layer 410 through the hidden layer 420 of the encoder 400A and the decoder 400B may perform a function to decode the result through the hidden layer 440 of the decoder 400B. Each of the encoder 400A and the decoder 4009 may include one or more hidden layers.

The autoencoder 400 may have a predetermined neural network structure. The neural network structure may be defined as the number of nodes constituting the neural network, a connection relationship of links linking the nodes to each other, and the weights granted to the respective links.

Referring back to FIG. 3, in the method for state decision of image data according to the exemplary embodiment of the present disclosure, the structure of the neural network of the network function may be decided based on the predetermined image data (S310). Herein, the network function may include the autoencoder that meets the definition of the neural network. The structure of the neural network of the network function may mean e nodes of the network function, the connection state of the links linking the nodes, and the weights granted to the links. In step S310, deciding the structure of the neural network may mean an operation of deciding the structure of the neural network in a structure suitable for the method for state decision of image data according to the exemplary embodiment of the present disclosure. The corresponding operation may be performed through unsupervised training. The operation of the network function and the operation of deciding the structure of the network function may mean that the controller or the module of the controller performs calculation according to at least one of a predetermined network function and a predetermined algorithm. For example, the node and weight deciding module 274 may decide the node and the weight by performing the calculation according to at least one of the predetermined network function and the predetermined algorithm.

For example, in step S310, the input data acquired based on the image data may be input in the input layer of the network function which is initially given. In step S310, the image data may be split into one or more image patches having a size suitable for input in the network function. Herein, the image data may be a video image captured by a capturing apparatus such as a camera, an infrared capturing apparatus, an X ray, a camcorder, or the like, but is not limited thereto.

As described above, the input data may be information (for example, R, G, and B values of respective pixels constituting the image data) including information on the image data without a loss. Alternatively, the input data may be data configured based on a feature value of the image data. The input data may be converted into the output data through the network function.

As described above, the network function may be the autoencoder of FIG. 4. The image patch input in the network function may be converted into the output data based on the structure of the network function. When the network function has the structure of the autoencoder, the number of nodes of the input layer and the number of nodes of the output layer may be the same as each other. Therefore, the image patch which is the input data and the output data may include mutually comparable information. For example, the output image patch having the same or similar size as the image patch which is the input data may be generated based on the output data.

In step S310, in order to generate the network function suitable for the method for deciding the image data according to the exemplary embodiment of the present disclosure, the apparatus 200 for state decision of image data may change the structure of the network function. The operation of changing the structure of the network function may mean changing at least one of the number of nodes of the network function, the connection relationship of the links, and the weights of the links.

For example, in order to decide the image data according to the exemplary embodiment of the present disclosure, the network function used in step S310 may be designed to conserve a feature shared by two or more image data having a similar type. For example, when the image data is generated based on data having the pattern such as the fabric, the leather, or the like, the network function may be designed so as for the output data to maintain the pattern shown in the fabric or leather. Alternatively, when the image data is generated based on images (for example, the captured images of the CT, the MRI, the X-ray, and the like) including medical information of a human body, the network function may be designed so that the output data maintains a feature which the shape of a healthy human organ has (for example, a pattern in a normal state of a blood vessel, or the like, a normal pattern of an inner wall of an organ without a tumor or an abnormal tissue, and the like). Alternatively, when the image data is generated based on data acquired by capturing an external shape of the fish, the network function may be designed so that the output data maintains features (for example, the shape of a scale of the fish, a layout and a proportion of a fin, and the like) of fishes of the same kind.

The network function suitable for the method for deciding the image data according to the exemplary embodiment of the present disclosure may meet the definition of the autoencoder. In this case, according to a characteristic of the autoencoder, the network function may include one or more hidden layers having nodes of the smaller number than the nodes included in the input layer and the output layer. Due to such a characteristic, some of the input data may be lost in the network function (autoencoder). During such a process, the network function designed to conserve one characteristic shared by two or more image data may lose data which do not belong to the corresponding characteristic. In this case, output data in which specific data is lost may be relatively lower than data in which data is not lost or lost data is small in terms of a similarity to the input data.

For example, data sharing a specific attribute may be defined as normal data and data which do not share the specific attribute may be defined as abnormal data. For example, when the pattern of the leather, or the like follows a general normal leather pattern, data based on the image acquired by capturing the leather may be defined as the normal data. Similarly, data based on the image acquired by capturing the pattern of the leather having defects including the scratch, contamination, and the like may be defined as the abnormal data, in this case, the network function receiving the normal data may output output data having a high similarity to the normal data. On the contrary, the network function receiving the abnormal data may output output data a relatively low similarity to the abnormal data. However, the number of states of the data may be defined as three or more. For example, according to the design, the state of the leather may be decided as three states of normality, abnormality by the contamination, and the abnormality by the scratch.

In step S310, when an initial structure of a predetermined network function does not meet the design condition, the apparatus 200 for state decision of image data according to the exemplary embodiment of the present disclosure may change the structure of the network function. Changing the structure of the network function may generally mean adjusting the weight granted to the link constituting the network function. The weight granted to the link is adjusted, and as a result, the network function may output output data in which lost information is small with respect to input data having a specific attribute.

In step S310, the controller 270 of the apparatus 200 for state decision of image data according to the exemplary embodiment of the present disclosure may perform an operation of adjusting the network function. The controller 270 adjusts the network function to decide the structure (at least one of the node, the weight, and the connection state) of the network function to be used in subsequent steps S320, S330, and S340 (S310). The controller 270 may adjust the network function based on a predetermined network function adjustment algorithm or a signal input through the input unit 250. In step S310, the controller 270 compares an input and an output of the network function to decide the similarity between the input and the output. When the input data is the normal data, the structure of the controller 270 may be adjusted in order to increase the similarity between the input and the output. As more input data are input in the network function, more adjustment steps are performed, and as a result, the network function which may be decided by the node and weight deciding module 274 may be configured to be suitable for the method for deciding the image data according to the exemplary embodiment of the present disclosure.

As described above, the image data may be split into multiple input patches, and as a result, the multiple input patches may be acquired from the image data for one target. The suitability of the network function may increase as data to be input in the network function, which is calculated by the calculation module 272 increases. Therefore, a large number of input data may be acquired, which is suitable for unsupervised learning with a small number of image data.

The network function having the structure decided through the node and weight deciding module 274 may be called a learned network.

When the network function is decided in step S310, the process may proceed to step S320 in order to decide the state of the image data.

In step S320, the image data may be input in the network function (decided in S310). The image data may be generated based on the image data directly captured by the camera unit 210 of the apparatus 200 for state decision of image data according to the exemplary embodiment of the present disclosure or received from the outside through the network connection unit 240 or input through the input unit 250. As described above, the image data may be split into image patches of a size which may be input in the network function. Alternatively, the size of the image data itself may be previously set to the size which may be input in the network function. The calculation module 272 may acquire the first output data from an output of the network function.

According to the exemplary embodiment of the present disclosure, the first output data acquired by the network function may have the same size as the extracted image patch. As described above, according to the exemplary embodiment of the present disclosure, the network function learned with respect to at least one pattern may output the first output data having the coherent feature when the network function receives the normal data. When the network function learned with respect to one pattern receives data having the defect, the data having the defect may be lower than the normal data in terms of the similarity to the output data acquired through the network function. That is, when the abnormal data having the defect is output by the calculation module 272, the similarity between the input data and the output data may be low. Alternatively, when the abnormal data passes through the network function, the output data may be relatively higher than the output data of the normal data in terms of the loss rate of the information.

Figure 5A:
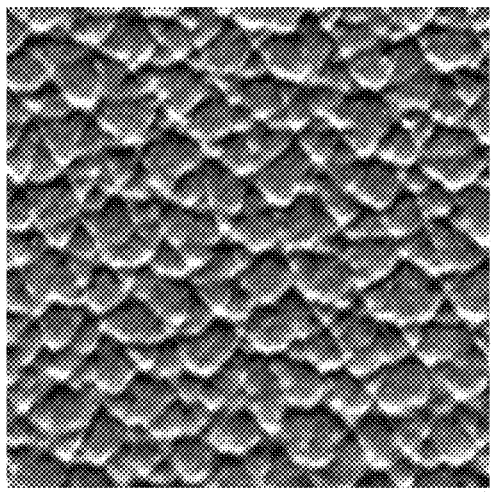
FIG. 5A is a diagram visually illustrating exemplary input data, of the method for state decision of image data according to an exemplary embodiment of the present disclosure.

FIG. 5A is a diagram visually illustrating exemplary input data of the method for decision state of image data according to an exemplary embodiment of the present disclosure. As illustrated in FIG. 5A, input data may be image data acquired by capturing capture objects such as leather, and the like. The capture object may include an image pattern having a coherent feature. In FIG. 5A, the coherent feature may mean the pattern of the leather. As illustrated in FIG. 5A, the pattern of the leather may be applied to all image data while maintaining the coherent feature. In other words, the image illustrated in FIG. 5A, a normal pattern of the leather is maintained throughout the image. The image may be defined as "normal data". As described above, when the normal data is set as the input data, the network function may output the output data which has comparatively smaller loss than the normal data which is the input data. As described above, the network function may be trained in order to output the output data which has the comparatively smaller loss than the normal data (S310).

Figure 5B:
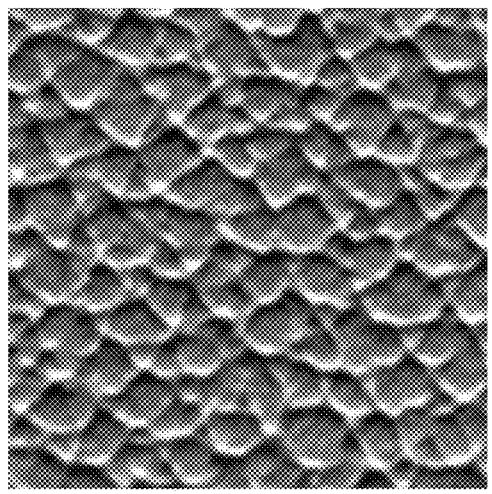
FIG. 5B is a diagram visually illustrating exemplary data output by the network function based on the input data illustrated in FIG. 5A in the method for state decision of image data according to the exemplary embodiment of the present disclosure.

FIG. 5B is a diagram visually illustrating exemplary data output by the network function based on the input data illustrated in FIG. 5A in the method for state decision of image data according to the exemplary embodiment of the present disclosure. The trained (for example, unsupervised learned) network function may generate the output data based on the normal image illustrated in FIG. 5A. As described above, when the network function generates the output data based on the normal data (the image data of FIG. 5A), the network function may output data having a comparatively small loss amount of the information included in the normal data. For example, when the network function is the autoencoder 400, the information may be lost due to existence of at least one hidden layer 430 having the small number of nodes than the input layer 410. However, in the case of the autoencoder 400 according to the exemplary embodiment of the present disclosure, the structure of the network function may be changed so as to be suitable for conserving the coherent feature included in the normal data (data maintaining the coherent feature throughout the data) (S310). As a result, the autoencoder 400 may output the output data (see FIG. 5B) maintaining the coherent feature included in the normal data (the image data of FIG. 5A). In the case of FIG. 5B, the coherent feature (a pattern defined along the curve of the leather) which exists in the pattern of the leather is maintained in the output data based on FIG. 5A. However, according to the characteristic of the autoencoder 400 or another predetermined network in which the data is lost, the image may be lost in the output data based on the normal data. For example, as illustrated in FIG. 5B, the resolution may deteriorate and a contrast may be lost due to the loss of the data in a high-frequency area, but an aspect of the data loss is not limited thereto.

Figure 6A:
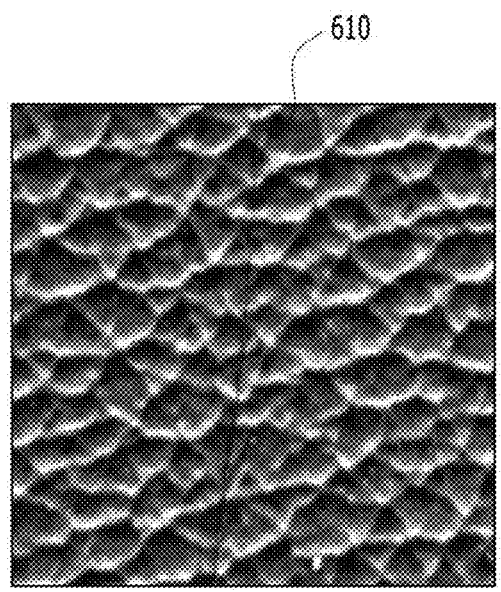
FIG. 6A is a diagram visually illustrating another exemplary input data of the method for decision state of image data according to the exemplary embodiment of the present disclosure.

FIG. 6A is a diagram visually illustrating another exemplary input data of the method for decision state of image data according to the exemplary embodiment of the present disclosure. As illustrated in FIG. 6A, like FIG. 5A, input data may be image data acquired by capturing capture objects such as leather. However, unlike FIG. 5A, the image illustrated in FIG. 6A may include an image part having a "different characteristic" with a property which is not included in coherent characteristics which exist in a pattern of the leather. For example, as illustrated in FIG. 6A, an image 600A may include an image part 610 which is displayed straightly on the leather. Generally, as illustrated in FIG. 5A, the pattern of the leather is defined according to curves of the leather, and for example, the curves of the leather have a "coherent characteristic", such as the case where regions generated by the curves of the leather have similar widths or a curvature of the curved line formed by the curves of the leather is generated in a predetermined range. However, the pattern of the leather may be defined to have any characteristic other than the aforementioned characteristic and is not limited to the aforementioned example. However, the image part 610 of FIG. 6A partitioning the region by a straight line may be recognized to deviate from the range of the "coherent characteristic".

Figure 6B:
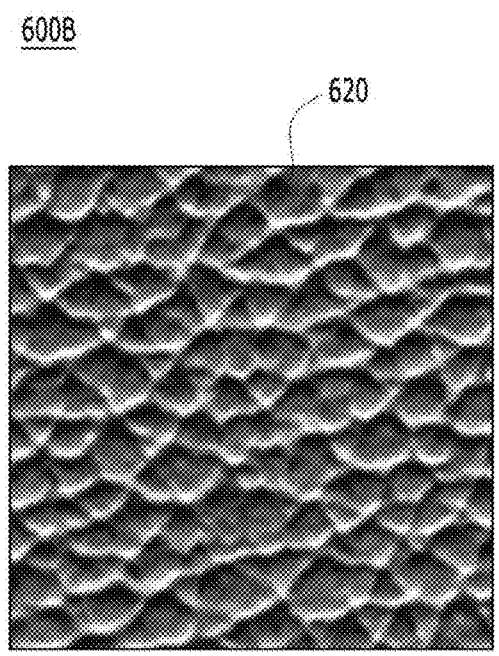
FIG. 6B is a diagram visually illustrating exemplary data output by the network function based on the input data illustrated in FIG. 6A in the method for state decision of image data according to the exemplary embodiment of the present disclosure.

FIG. 6B is a diagram visually illustrating exemplary data output by the network function based on the input data illustrated in FIG. 6A in the method for state decision of image data according to the exemplary embodiment of the present disclosure. As described above, a network function (alternatively, an auto encoder 400) may be trained to output data with a relatively low information loss rate for the "coherent characteristic" which exists in the input data and a relatively large information loss rate for the data having the "different characteristic" therefrom (S310). According to an exemplary embodiment of the present disclosure, the network function 400 may output the output data (the image data illustrated in FIG. 6B) on the basis of the image data based on the image illustrated in FIG. 6A. As illustrated in FIG. 6B, the network function according to the exemplary embodiment of the present disclosure may output the output data with relatively low information loss for the coherent characteristic of the leather pattern throughout the input data. However, in the case of the image part 610 of the input data 600A having the different pattern, the information loss rate on the output data may be relatively large. In other words, as illustrated in FIG. 6B, an image part 600B of the output data corresponding to the image part 610 having the different pattern may lose a considerable pail of information (for example, the part 620 illustrated by a straight line) according to the different pattern.

Figure 7A:
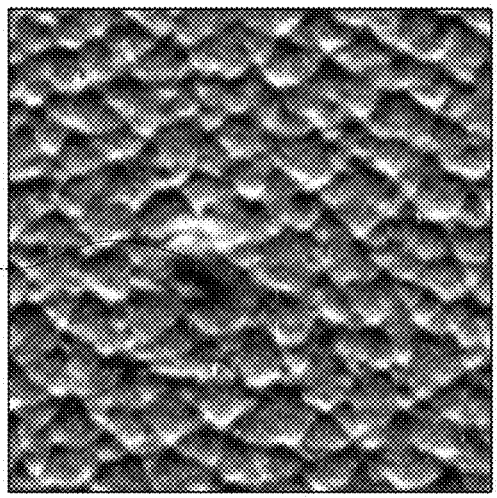
FIG. 7A is a diagram visually illustrating yet another exemplary input data of the method for decision state of image data according to the exemplary embodiment of the present disclosure.

FIG. 7A is a diagram visually illustrating yet another exemplary input data of the method for decision state of image data according to the exemplary embodiment of the present disclosure. As illustrated in FIG. 7A, like FIG. 5A, input data may be image data acquired by capturing capture objects such as leather. However, unlike FIG. 5A, an image illustrated in FIG. 7A may include an image part having a "different characteristic" with a property which is not included in coherent characteristics which exist in a pattern of the leather. For example, as illustrated in FIG. 7A, an image 700A may include an image part 710 which is displayed by circular dark spots on the leather. Generally, as illustrated in FIG. 5A, the pattern of the leather is defined according to curves of the leather, and for example, the curves of the leather have a "coherent characteristic", such as the case where regions generated by the curves of the leather have similar widths or a curvature of the curved line formed by the curves of the leather is generated in a predetermined range. However, the pattern of the leather may be defined to have any characteristic other than the aforementioned characteristic and is not limited to the aforementioned example. However, the image part 710 of FIG. 7A partitioning the region by a straight line may be recognized to deviate from the range of the "coherent characteristic".

Figure 7B:
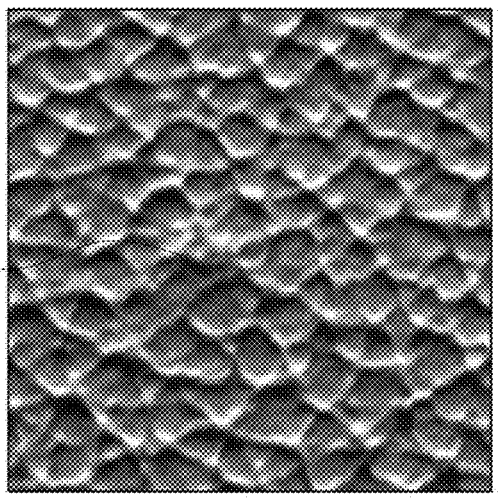
FIG. 7B is a diagram visually illustrating exemplary data output by the network function based on the input data illustrated in FIG. 7A in the method for state decision of image data according to the exemplary embodiment of the present disclosure.

FIG. 7B is a diagram visually illustrating exemplary data output by the network function based on the input data illustrated in FIG. 7A in the method for state decision of image data according to the exemplary embodiment of the present disclosure. As described above, a network function (alternatively, the auto encoder 400) may be trained to output data with a relatively low information loss rate for the "coherent characteristic" which exists in the input data and a relatively large information loss rate for the data having the "different characteristic" (S310). According to an exemplary embodiment of the present disclosure, the network function 400 may output the output data (the image data illustrated in FIG. 7B) on the basis of the image data based on the image illustrated in FIG. 7A. As illustrated in FIG. 7B, the network function according to the exemplary embodiment of the present disclosure may output the output data with a relatively low information loss for the coherent characteristic of the leather pattern throughout the input data. However, in the case of the image part 710 of the input data 700A having the different pattern, the information loss rate on the output data may be relatively large. In other words, as illustrated in FIG. 7B, an image part 700B of the output data corresponding to the image part 710 having the different pattern may lose a considerable part of information (for example, the part 720 illustrated by the circular dark spots) according to the different pattern.

Referring back to FIG. 3, in step S330, the same image data as the image input in the network function in step S320 may be modulated by an algorithm having a different effect from the network function. The algorithm having the different effect from the network function according to the exemplary embodiment of the present disclosure may be any algorithm which loses or modifies at least a part of the input image data. Accordingly, second output data may be an image with a lower resolution than the input image data or an image including a distorting effect. The second output data may be digitized in various methods. For example, the second output data may be digitized by analyzing the number of closed curves having a predetermined color of the second output data. Further, a contrast value may be measured on the basis of a contrast of the entire color of the second output data. For example, the algorithm having the different effect may be an image reduction and expansion algorithm which loses information of the input image data. However, the algorithm having the different effect is not limited to the aforementioned example and may use any algorithm which loses the information of the input image data or reduces the resolution.

For example, according to the exemplary embodiment of the present disclosure, the algorithm having the different effect from the network function may be an algorithm that divides the image data into images having predetermined sizes and then acquires the second output data based on an average data value of the divided images. The second output data may be data comparable with the first output data through the loss or the modification of the data based on the input image data. For example, the entire image may be mosaicked by dividing an image patch with a size of 256×256 into 4096 image patches with sizes of 4×4 and expressing an average of the colors of the divided 4×4 image patches. As another example, the algorithm may be an algorithm in which the input image data is reduced to 1/n magnification and expanded n times again to obtain the second output data with the data modified by modification of the sizes. The image data input through the algorithm may include an effect in which the size is modified through the algorithm and the second output data is distorted. Herein, a value of reduction or expansion magnification n may be determined based on the size of the image patch extracted from the network function. As yet another example, the algorithm may be an algorithm which obtains modification of the input image data by converting a color mode. In detail, when the input image data is in an RGB color mode, the mode is changed to a CMYK color mode and then changed to a RAB color mode to obtain the second output data. The algorithm which loses or modifies the input image data is just exemplified and the present disclosure is not limited thereto.

When step S330 is performed, the calculation module 272 may obtain the second output data.

In step S340, the controller 270 may determine state information of the image data based on the first data and the second data. In step S310, for example, when the network function is the auto encoder, due to a characteristic of the auto encoder having a hidden layer having nodes of the smaller number than the nodes of the input layer, the input image data may experience the loss of the information. As described above, according to a state of the input image data, the loss degree of the information may be different. However, generally, the input image data may experience a decrease in the resolution due to the loss of the information.

As described above, when the characteristic of the input image data matches the characteristic of the network function which is subjected to the unsupervised training in step S310, the loss and the distortion of the information may be relatively low. That is, when the input image data is for example, normal data, the output data passing through the network function may have a high similarity with the normal data. However, even in the case, there may be a difference between in the input data and the output data due to the loss and the distortion of the information. Accordingly, in step S320, the state determination module 273 may directly compare the input data and the output data to decrease the accuracy of the state determination of the image data.

Accordingly, the calculation module 272 may acquire the second output data with the loss of the information which is suitable for comparison with the first output data. The different algorithm may be an algorithm having a data loss rate similar to a general data loss rate of the network function in step S320. For example, the different algorithm in step S330 may be an algorithm having a resolution reduction rate similar to a resolution reduction rate due to the network function in step S320. For example, when the different algorithm in step S330 is the reduction and expansion algorithm of the image data, the magnification of reduction and expansion may be determined so that the resolution reduction rate is similar to the resolution reduction rate of the network function in step S320.

The second output data acquired by the calculation module 272 has a data loss rate similar to that of the first output data, and thus direct comparison may be easy. Accordingly, the state determination module 273 may determine the state of the image data based on the similarity between the first output data and the second output data.

In step S340, the state determination module 273 may use any algorithm which determines similarity between the two data. For example, the state determination module 273 may determine the similarity of the data based on a difference image between the first output data and the second output data. In another example, the state determination module 273 may calculate a normalized cross correlation (NCC) value by various kernels based on the first output data and the second output data. The state determination module 273 may determine the NCC value as a defect if it is smaller than a predetermined reference value and as a normal if it is equal to or larger than the reference value. The kernel may have various sizes such as 16×16, 24×24, and 32×32. However, the present disclosure is not limited by the sizes of the kernel.

According to the exemplary embodiment of the present disclosure, the state determination module 273 may determine state information of the image data based on the difference image between the first output data and the second output data. Based on first difference image data which is a difference image between the first output data and the input image data and second difference image data which is a difference image between the second output data and the input image data, the state determination module 273 may determine the state information of the image data. The state determination module 273 may additionally calculate a difference image value between the first difference image data and the second difference image data, that is, the two difference image data and calculate the NCC value with respect to the kernels having various sizes. The state determination module 273 may calculate the difference image as a black color if compared pixels are the same as each other and include different colors if not, and may determine the state information of the image data as the normal image data if a ratio (for example, 95%) of the black color of the difference image is equal to or greater than the reference value. A method of comparing the first output data and the second output data may use a method of calculating a difference by calculating a binary-coded value with respect to a specific dot, a method of comparing the number of closed curves by finding a contour, a method of calculating a relative distance between reference lines by extracting the reference lines, and the like. The present disclosure is not limited to the methods of comparing the first output data and the second output data and the ratio values.

Figure 8A:
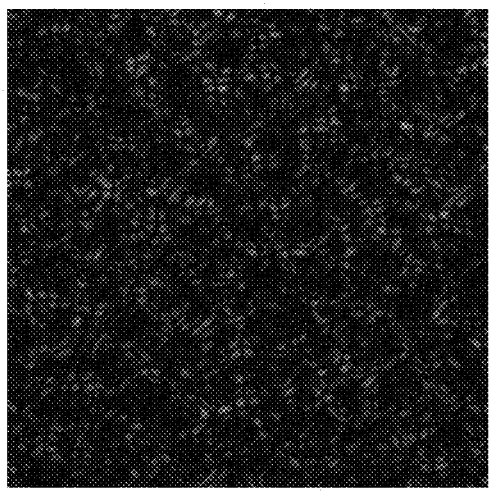
FIG. 8A is a diagram visually illustrating exemplary data in which a difference image is acquired based on images of FIGS. 5A and 5B in the method for state decision of image data according to the exemplary embodiment of the present disclosure.

FIG. 8A is a diagram visually illustrating exemplary data in which a difference image is acquired based on images of FIGS. 5A and 5B in the method for state decision of image data according to the exemplary embodiment of the present disclosure. A difference image of FIG. 8A may be a result of acquiring a difference image between the image of FIG. 5A which is the input data and the image of FIG. 5B which is an exemplary data among the output data having the coherent characteristic. Since FIG. 5A illustrates normal input data without a defect part, the output data which is the image of FIG. 5B may have a low loss of the data. As a result, since the difference between the input data and the output data is small, a ratio of the black part of the difference image may be larger than the ratio obtained from an abnormal image. The difference image may have more black parts as the difference is smaller. Accordingly, if the data loss of the output data obtained through the network function is small, the ratio of the black part may be relatively large. The state of the age data may be determined based on the difference image of FIG. 8A and the state of the image data may also be determined based on calculation of the NCC value and the like. The method of comparing the image data is just exemplified and the present disclosure is not limited thereto.

Figure 8B:
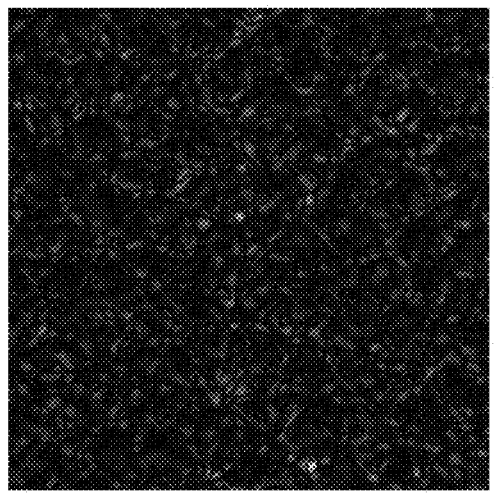
FIG. 8B is a diagram visually illustrating exemplary data in which the difference image is acquired based on the images of FIGS. 6A and 6B in the method for state decision of image data according to the exemplary embodiment of the present disclosure.

FIG. 8B is a diagram visually illustrating another exemplary data in which the difference image is acquired based on the images of FIGS. 6A and 6B in the method for state decision of image data according to the exemplary embodiment of the present disclosure. A difference image of FIG. 8B may be a result of acquiring a difference image between the image of FIG. 6A which is the input data and the image of FIG. 6B which is an exemplary data among the output data having the different characteristic. Since FIG. 6A illustrates data with a defect part, the output data which is the image of FIG. 6B may have a relatively high loss rate of the data. As a result, the difference between the input data and the output data may be large, and a ratio of the black part of the difference image may be smaller than the ratio obtained from a normal image. The difference image may have more black parts as the difference is smaller. In detail, the part corresponding to the image part 610 displayed by a straight line of FIG. 6A may not be represented by the black color in FIG. 8B. Accordingly, if the data loss of the output data obtained through the network function is large, the ratio of the black part may be relatively low. The state of the image data may be determined based on the difference image of FIG. 8B and the state of the image data may also be determined based on calculation of the NCC value and the like. The method of comparing the image data is just exemplified and the present disclosure is not limited thereto.

Figure 8C:
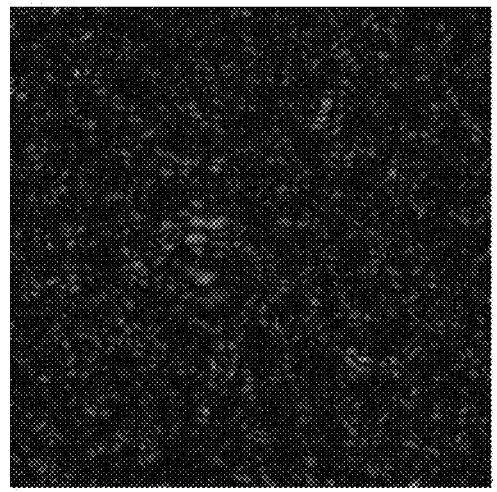
FIG. 8C is a diagram visually illustrating exemplary data in which the difference image is acquired based on the images of FIGS. 7A and 7B in the method for state decision of image data according to the exemplary embodiment of the present disclosure.

FIG. 8C is a diagram visually illustrating another exemplary data in which the difference image is acquired based on the images of FIGS. 7A and 7B in the method for state decision of image data according to the exemplary embodiment of the present disclosure. A difference image of FIG. 8C may be a result of acquiring a difference image between the image of FIG. 7A which is the input data and the image of FIG. 7B which is an exemplary data among the output data having the different characteristic. Since FIG. 7A illustrates data with a defect part, the output data which is the image of FIG. 7B may have a relatively large loss rate of the data. As a result, the difference between the input data and the output data may be large, and a ratio of the black part of the difference image may be smaller than the ratio obtained from a normal image. The difference image may have more black parts as the difference is smaller. In detail, the part corresponding to the image part 710 represented by the circular black spot of FIG. 7A may not be represented by the black color in FIG. 8C. Accordingly, if the data loss of the output data obtained through the network function is large, the ratio of the black part may be relatively small. The state of the image data may be determined based on the difference image of FIG. 8C and the state of the image data may also be determined based on calculation of the NCC value and the like. The method of comparing the image data is just exemplified and the present disclosure is not limited thereto.

According to the exemplary embodiment of the present disclosure, the method of determining the state of the image data may further include determining at least one of a node, a weight, and a connection state of the network function based on the predetermined image data before acquiring the first output data. The node and weight determination module 274 may learn the network function with respect to the predetermined image data by changing at least one of the node, the weight, and the connection state of the network function. The node and weight determination module 274 may change at least one of the node, the weight, and the connection state of the network function based on the same or similar parts of the characteristic part of the predetermined image data.

According to the exemplary embodiment of the present disclosure, the method of determining the state of the image data may further include repeating the determining of at least one of the node, the weight, and the connection state of the network function, and the predetermined image data may be one or more normal image data without the defect. The repeating of the determining at least one of the node, the weight, and the connection state of the network function may be repeated until there is no change in the network function. The node and weight determination module 274 may repeat the operation of determining the node, the weight, and the connection state with respect to the sizes of various image patches extracted by the network function. The node and weight determination module 274 defines the network function as the learned network function with respect to at least one pattern if there is no change in the network function and inputs the image data to the learned network function to acquire the first output data by the network function. The predetermined image data may be the normal image data without the defect and may not be the same data. The calculation module 272 may output the first output data which has not almost relatively different from the image data input through the network function learned by using the normal image data. The node and weight determination module 274 may determine at least one of the node, the weight, and the connection state of the network function so as to decrease the difference between the input image data and the first output data and repeat the determination to decrease the difference with respect to other image data.

Figure 9:
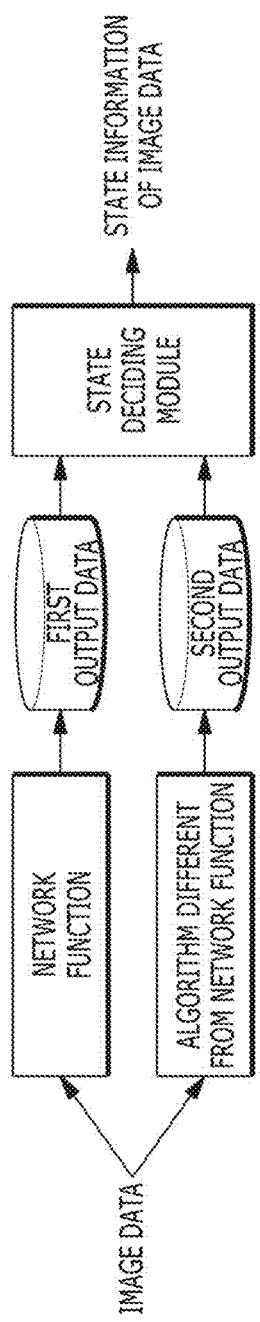
FIG. 9 is a conceptual view for describing a state decision structure of image data according to an exemplary embodiment of the present disclosure.

FIG. 9 is a conceptual view for describing a state decision structure of image data according to an exemplary embodiment of the present disclosure.

The same image data may be input to the network function and the different algorithm from network function. The first output data includes an output value by the network function and the second output data includes an output value by the different algorithm from the network function. In the first output data and the second output data, at least one of the image resolution, the size, the color mode, and the aspect ratio may be the same or comparable. The state information of the image data may be state information determined based on the first output data and the second output data. The example of the same data is just an example and the present disclosure is not limited thereto.

The state determination module may generate state information of the image data based on the first output data and the second output data. The state information of the image data may be normal or abnormal and include information on one or more grades. Further, the state information of the image data may include a comment on the specific abnormal data or the state information.

Figure 10:
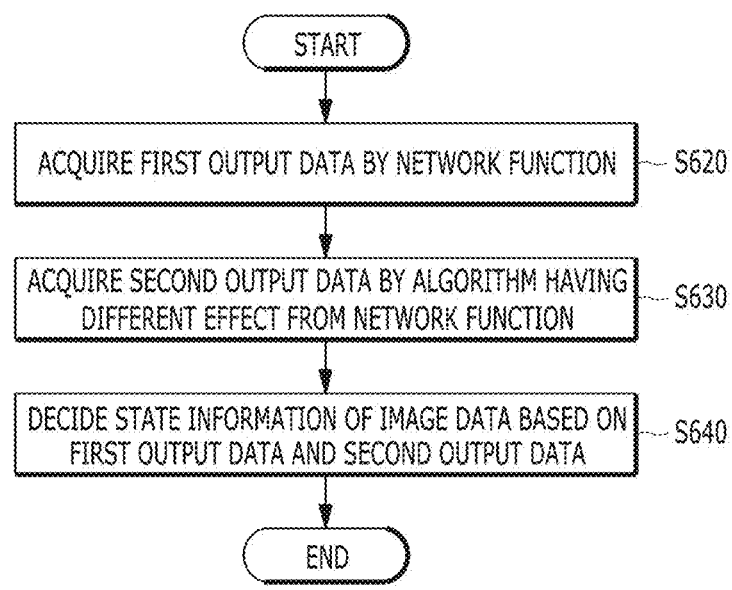
FIG. 10 is a flowchart illustrating a method for state decision of image data according to an exemplary embodiment of the present disclosure.

FIG. 10 is a flowchart illustrating a method for state decision of image data according to an exemplary embodiment of the present disclosure.

According to the exemplary embodiment of the present disclosure, the method of determining the state of the image data may be configured without including a pre-learning step. The method of determining the state of the image data may include acquiring first output data by the network function (S620), acquiring second output data by an algorithm having a different effect from the network function (S630), and determining state information of the image data based on the first output data and the second output data (S640). The respective steps may be similarly described to correspond to the aforementioned steps of FIG. 3.

Figure 11:
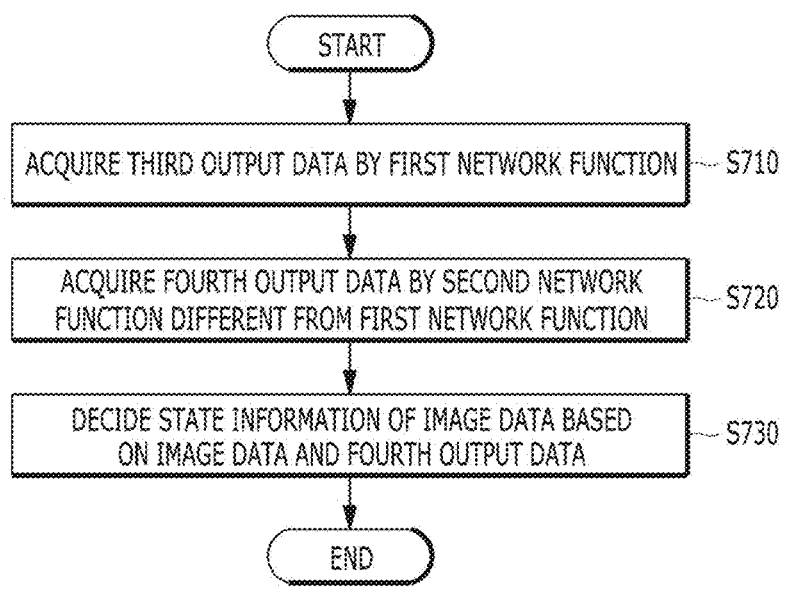
FIG. 11 is a block diagram for describing a state decision structure of image data according to another exemplary embodiment of the present disclosure.

FIG. 11 is a flowchart of a method for state decision of image data using two or more network functions according to another exemplary embodiment of the present disclosure.

According to another exemplary embodiment of the present disclosure, the method of determining the state of the image data may include acquiring third output data by a first network function (S710). When the network function learned for one pattern receives the normal data, coherent similar third output data may be output. When the network function learned for one pattern receives the data with the defect, the data with the defect may have a different compression result from the normal data. Further, when the learned network function receives the data with the defect, the third output data reconstructing the normal image data and the third output data reconstructing the defect image data may be different from each other.

According to another exemplary embodiment of the present disclosure, the method of determining the state of the image data may include acquiring fourth output data by a second network function which is different from the first network function (S720). The acquiring of the fourth output data may be executed based on the third output data. The acquiring of the fourth output data may be executed by the second network function reconstructing at least one lost part of the lost third output data. For example, the second network function which is the reconstructed network function may be a network function in which a resolution decreased by the first network function is reconstructed to the same resolution as the input image data. The second network function may be configured in combination of a plurality of network functions and another compression and/or reconstruction network function may be connected after the second network function.

According to another exemplary embodiment of the present disclosure, the second network function may be a reconstruction network function that reconstructs at least a part of the image data lost by the first network function. The fourth output data acquired through the reconstruction network function may have the same image resolution, size, and the like as the image data. The fourth output data and the image data may include a configuration having the same or similar values to be comparable. The reconstruction network function may reconstruct at least a part of the image data by changing at least a part of the third output data.

According to another exemplary embodiment of the present disclosure, the method of determining the state of the image data may include determining state information of the image data based on the image data and the fourth output data (S730). The image data input the first network function and the fourth output data may be data in which at least one of the image resolution, the size, the color mode, and the aspect ratio is the same. An actual defect may be detected by comparing the image data and the fourth output data and the state information of the image data may be determined based on the same part. In detail, the method of determining the state information of the image data may be a method of determining the state information through a difference from a reference value by calculating an NCC value, a difference image, binarization, a closed curve of the contour, a relative distance between reference lines, and the like. The example of the same data and the method of determining the state information of the image data are just exemplified and the present disclosure is not limited thereto.

Figure 12:
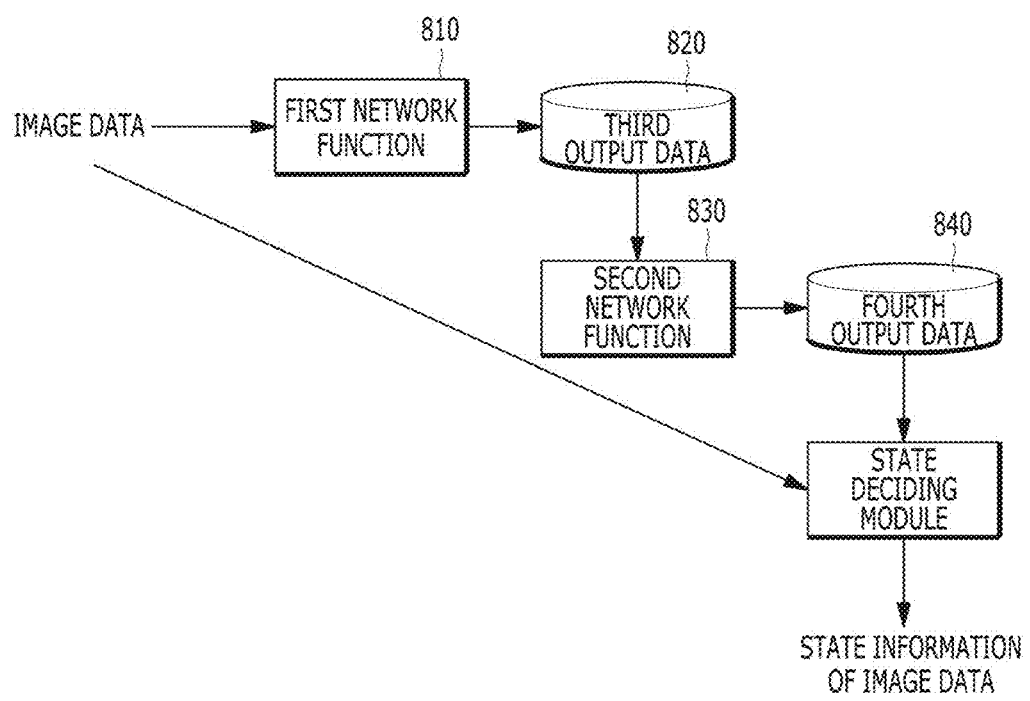
FIG. 12 is a conceptual view for describing the state decision structure of image data according to another exemplary embodiment of the present disclosure.

FIG. 12 is a conceptual view for describing the state decision structure of image data according to another exemplary embodiment of the present disclosure.

According to another exemplary embodiment of the present disclosure, a second network function 830 may be a reconstruction network function to reconstruct at least a part of image data lost by a first network function 810. Fourth output data 840 acquired through the reconstruction network function may have the same image resolution, size, and the like as the image data. The fourth output data 840 and the image data may include components having the same numerical value so as to be compared with each other. The reconstruction network function may reconstruct at least a part of the image data by changing at least a part of third output data 820.

The fourth output data 840 may be data acquired by reconstructing at least a part of the lost third output data 820. The fourth output data 840 may include a similar part to the image data. For example, the fourth output data has the same resolution as the image data, and as a result, the state deciding module may generate the state information of the image data based on the same resolution. The second network function 830 may be a network function to allow a value of at least a partial component to be configured to be the same as or similar to the image data.

Figure 13:
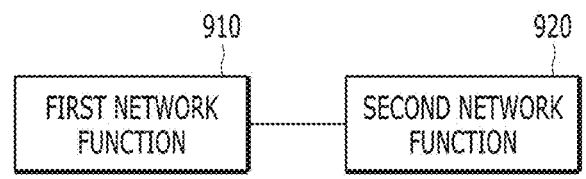
FIG. 13 is a conceptual view illustrating a network function in which two or more network functions are connected according to another exemplary embodiment of the present disclosure.

FIG. 13 is a conceptual view illustrating a network function in which two or more network functions are connected according to another exemplary embodiment of the present disclosure.

According to the exemplary embodiment of the present disclosure, a first network function 910 and a second network function 920 are connected to configure the network function. The first network function 910 may include third output data which is the aggregate of output nodes. The second network function 920 may include fourth output data which is the aggregate of other output nodes. The first network function analyzes input image data to substitute the analyzed image data in the aggregate of input nodes. A value input in the node may be calculated by a next node by the link or weight. The number of nodes, the connection state, and a layer structure of the network function may be disposed by configuring changeable combinations. The network function may not be disposed in a layer form but may be configured according to a layout of a predetermined node. The network function may include not the network function of a compressed algorithm but the network function of an extended algorithm. All nodes of the network function may not be connected to the link and a node which is not connected may exist.

According to an exemplary embodiment of the present disclosure, a computer program stored in a computer readable storing medium executed by one or more processors of an apparatus for state decision of image data may include a plurality of commands. The computer program may include: a command to allow a calculation module to acquire first output data by a network function based on the image data; a command to allow the calculation module to acquire second output data by an algorithm having a different effect from the network function based on the image data; and a command to allow a state deciding module to decide state information of the image data based on the first output data and the second output data.

According to another exemplary embodiment of the present disclosure, computer program stored in a computer readable storing medium, which includes a plurality of commands executed by one or more processors of an apparatus for state decision of image data may include a plurality of commands. The computer program may include: a command to acquire third output data by a first network function based on the image data; a command to acquire fourth output data by a second network function different from the first network function based on the third output data; and a command to decide state information of image data based on the image data and the fourth output data.

It will be appreciated by those skilled in the art that information and signals may be expressed by using various different predetermined technologies and techniques. For example, data, instructions, commands, information, signals, bits, symbols, and chips which may be referred in the above description may be expressed by voltages, currents, electromagnetic waves, magnetic fields or particles, optical fields or particles, or predetermined combinations thereof.

It may be appreciated by those skilled in the art that various exemplary logical blocks, modules, processors, means, circuits, and algorithm steps described in association with the exemplary embodiments disclosed herein may be implemented by electronic hardware, various types of programs or design codes (for easy description, herein, designated as "software"), or a combination of all of them. In order to clearly describe the intercompatibility of the hardware and the software, various exemplary components, blocks, modules, circuits, and steps have been generally described above in association with functions thereof. Whether the functions are implemented as the hardware or software depends on design restrictions given to a specific application and an entire system. Those skilled in the art of the present disclosure may implement functions described by various methods with respect to each specific function, but it should not be analyzed that the implementation determination departs from the scope of the present disclosure.

Various exemplary embodiments presented herein may be implemented as manufactured articles using a method, an apparatus, or a standard programming and/or engineering technique. The term "manufactured article" includes a computer program, a carrier, or a medium which is accessible by a predetermined computer-readable device. The media may include storage media or communication media. For example, a computer-readable storage medium includes a magnetic storage device (for example, a hard disk, a floppy disk, a magnetic strip, or the like), an optical disk (for example, a CD, a DVD, or the like), a smart card, and a flash memory device (for example, an EEPROM, a card, a stick, a key drive, or the like), but is not limited thereto.

The communication media generally implement the computer readable command, the data structure, the program module, or other data in a carrier wave or a modulated data signal such as other transport mechanism and include all information transfer media. The term modulated data signal means a signal acquired by configuring or changing at least one of characteristics of the signal so as to encode information in the signal. As not a limit but an example, the communication media include wired media such as a wired network or a direct-wired connection and wireless media such as acoustic, RF, infrared and other wireless media.

It will be appreciated that a specific order or a hierarchical structure of steps in the presented processes is one example of exemplary accesses. It will be appreciated that the specific order or the hierarchical structure of the steps in the processes within the scope of the present disclosure may be rearranged based on design priorities. Appended method claims provide elements of various steps in a sample order, but it does not mean that the method claims are limited to the presented specific order or hierarchical structure.

The description of the presented exemplary embodiments is provided so that those skilled in predetermined art of the present disclosure use or implement the present disclosure. Various modifications of the exemplary embodiments will be apparent to those skilled in the art and general principles defined herein can be applied to other exemplary embodiments without departing from the scope of the present disclosure. Therefore, the present disclosure is not limited to the embodiments presented herein, but should be analyzed within the widest range which is coherent with the principles and new features presented herein.

What is claimed is:

1. A method for state decision of image data, processed by at least one computer processor, using a network function learned with respect to at least one pattern, the method comprising:
    acquiring first output data by the network function based on the image data;
    acquiring second output data based on the image data by an algorithm that loses or modifies at least some of the image data and has a different effect from the network function; and
    deciding state information of the image data based on the similarity of the first output data and the second output data.

2. The method of claim 1, wherein the network function includes a plurality of links having a plurality of nodes and weights, at least one input node, and at least one output node.

3. The method of claim 2, wherein the network function includes a first aggregate of one or more nodes including the plurality of links having the plurality of nodes and weights, and
    includes a second aggregate constituted by nodes of the same number as or the smaller number than a number of the at least one input node.

4. The method of claim 1, further comprising:
    before the acquiring of the first output data, determining at least one of the nodes, the weights, and a connection state of the network function based on predetermined image data.

5. The method of claim 4, further comprising:
    repeating the determining of the at least one of the nodes, the weights, and the connection state of the network function,
    wherein the predetermined image data is one or more normal image data having no defect.

6. The method of claim 1, wherein the algorithm is an algorithm in which the image data is split into images having a predetermined size and thereafter, the second output data is acquired based on an average data value of the split images.

7. The method of claim 6, wherein the predetermined size is a size set based on a data loss rate of the network function.

8. The method of claim 1, wherein the second output data is image data modified so that at least one of an image resolution, an image size, an image color mode, and an aspect ratio is the same as that of the first output data.

9. The method of claim 1, wherein in the deciding of the state information, the state information of the image data is decided based on a difference between the first output data and the second output data.

10. An apparatus for state decision of image data using a network function learned with respect to at least one pattern, the apparatus comprising:
    a camera configured to capture a state decision target; and
    a controller configured to:
        control the apparatus and perform calculation by using the network function,
        acquire first output data by the network function based on the image data,
        acquire second output data based on the image data by an algorithm that loses or modifies at least some of the image data and has a different effect from the network function, and
        determine state information of the image data based on the similarity of the first output data and the second output data.

11. A non-transitory computer readable medium storing a computer program and including a process executed by one or more processors of an apparatus for state decision of image data, the process comprising:
    acquiring first output data by a network function based on the image data;
    acquiring second output data based on the image data by an algorithm that loses or modifies at least some of the image data and has a different effect from the network function; and
    deciding state information of the image data based on the similarity of the first output data and the second output data.

12. A method for state decision of image data, processed by at least one computer processor, using a network function learned with respect to at least one pattern, the method comprising:
    acquiring first output data by the network function based on the image data;
    acquiring second output data by an algorithm partitioning the image data into images with a predetermined size based at least on a data loss rate of the network function, the second output data being based on an average data value of the partitioned images; and
    deciding state information of the image data based on the first output data and the second output data.

* * * * *